July 26, 1960 W. W. WELTMER 2,946,345
BAFFLE STRUCTURE FOR TANKS
Filed Jan. 24, 1957
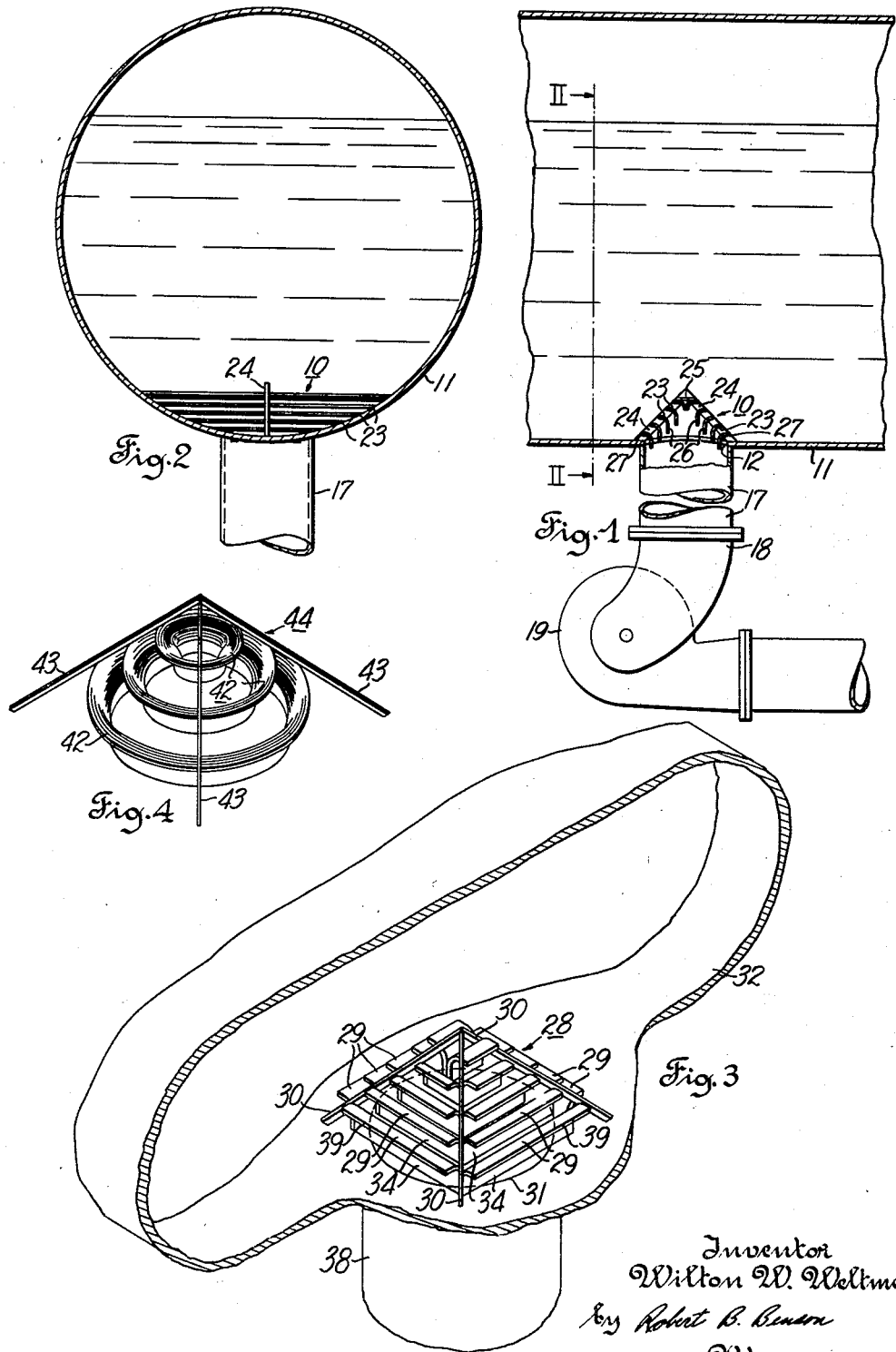
Inventor
Wilton W. Weltmer
By Robert B. Benson
Attorney

United States Patent Office 2,946,345
Patented July 26, 1960

2,946,345

BAFFLE STRUCTURE FOR TANKS

Wilton W. Weltmer, Milwaukee, Wis., assignor to Allis-Chalmers Manufacturing Company, Milwaukee, Wis.

Filed Jan. 24, 1957, Ser. No. 636,057

5 Claims. (Cl. 137—590)

This invention relates generally to the pumping of fluids from tanks. More specifically this invention relates to baffles positioned within a container such as a deaerator to regulate the flow of fluid being pumped from the container.

When pumping water from a tank such as a deaerator, it has been observed that the flow of water is pulsating and far below the capacity of the outlet conduits leading from the tank and the capacity of the pump used to draw the liquid from the tank. It is believed that this condition exists because the fluid in the tank when converging on the outlet from different directions meets head on creating a great deal of turbulence and swirls around to form a vortex at the mouth of the outlet which prevents a full capacity of liquid from entering the outlet conduit.

The baffle structure of this invention attempts to overcome this problem observed in pumping fluid from tanks by placing a series of elbow vanes adjacent the outlet of the tank. These vanes are arranged to receive the fluid flowing toward the outlet and direct it into a path substantially parallel to the longitudinal axis of the outlet conduit. The vanes prevent the different streams of fluid from meeting head on and causing turbulence and thereby forming a vortex. By breaking up the vortex a more constant flow of fluid from the tank is obtained and a higher volume of fluid is discharged from the pump in the system for a given horsepower input.

Therefore it is the object of this invention to provide a new and improved baffle structure for fluid containing tanks.

Another object of this invention is to provide a new and improved baffle structure for directing fluid out of the container.

Objects and advantages other than those set forth above will be apparent from the following description when read in connection with the accompanying drawings in which:

Fig. 1 illustrates a pumping system with a longitudinal cross section of a tank embodying the baffle structure of this invention;

Fig. 2 is a cross section view taken along the line II—II of Fig. 1;

Fig. 3 is a pictorial view of a tank embodying a pyramid shaped baffle structure of this invention; and Fig. 4 is a pictorial view of a conical shaped baffle structure of this invention.

Referring now in particular to the drawings the preferred baffle structure 10 of this invention is illustrated in Figs. 1 and 2 in connection with a cylindrical tank 11. The tank 11 defines an outlet 12 intermediate its ends. An outlet conduit 17 is connected to the outlet 12 and extends to the intake 18 of a centrifugal pump 19. Although a centrifugal pump is illustrated any kind of means for drawing fluid from the tank could be used in place of the centrifugal pump.

The baffle structure of this invention comprises a series of spaced apart baffles or vanes 23 in a cascade arrangement on a graduated incline positioned over the opening to the outlet of the tank 11 to guide the fluid being drawn from the tank into the outlet conduit 17. The vanes 23 of baffle structure 10 are mounted on inclined supports 24 and are spaced apart to allow the fluid to flow between adjacent vanes. The vanes 23 extend transversely across the tank 11 and are arranged on the inclined support 24 to form an inverted troughlike baffle structure 10 with the ridge 25 of the structure being removed from the outlet of the tank. The vanes 23 are generally L-shaped with the inner portion 26 extending in a direction substantially parallel to the longitudinal axis of the outlet conduit 17. The outer portion 27 of the vanes 23 preferably extends in a direction substantially parallel to the anticipated flow of fluid converging on the outlet 12 of the tank 11. However the exact direction of flow in the tank varies and is very difficult to determine. Therefore the outer portions 27 extend in a direction approximating the anticipated direction of flow of the fluid converging on the outlet.

A second embodiment of the invention is illustrated in Fig. 3 in which the baffle structure 28 comprises a plurality of spaced apart vanes 29 arranged on supports 30 in the form of a pyramid which is positioned directly over the outlet 31 of a tank 32. In this embodiment the vanes 29 are mounted on inclined supports 30 which extend from the apex of the pyramid to the bottom of the tank at the four corners of the pyramid. As in the first embodiment the vanes 29 are substantially L-shaped in cross section with the inner portion 34 extending in a direction substantially parallel to the longitudinal axis of the outlet conduit 38. The outer portion 39 of the vanes 29 extend in the direction of the anticipated flow of the fluid within the tank 32 converging on the outlet. The vanes 29 are spaced apart to allow fluid to flow between adjacent vanes and thereby follow the contour of the vanes. The pyramid shaped baffle structure 28 of Fig. 3 is particularly advantageous in large tanks having an outlet in the center so that the fluid in the tank converges on the outlet from all directions in substantially equal quantities.

A third embodiment of this invention is illustrated in Fig. 4 in which a plurality of annular elbow vanes 42 are arranged on inclined supports 43 to form a cone shaped baffle structure 44. The cone shaped baffle structure 44 is adapted to be positioned over the outlet of a tank. As in the other embodiments, the vanes 42 are substantially L-shaped in cross section and receive fluid flowing in the tank and direct it through the outlet of the tank in a path substantially parallel to the longitudinal axis of the outlet conduit.

The operation of the baffle structures in all embodiments is substantially the same and therefore the following explanation of the operation will serve to explain the operation of all three embodiments. When fluid is drawn from the tank by the pump, the fluid in the tank converges on the outlet from all directions. Ordinarily the different streams of fluid would meet head on and swirl thereby forming a vortex in the mouth of the outlet which would prevent a full flow of fluid into the outlet conduit. However, with the vanes of this invention positioned over the outlet the fluid flows between adjacent vanes and follows the contour of the vanes. The portion of the vanes extending outward into the tank are positioned to receive the fluid with a minimum of turbulence and the inner portions of the vanes are positioned to direct the fluid leaving the vanes and the tank in a path substantially parallel to the longitudinal axis of the outlet conduit. The streams of fluid in the tank follow the contour of the vanes and flow into the outlet conduit without meeting head on. Therefore the vortex is eliminated and turbulence reduced to a minimum resulting in a substantially uniform quantity of water flowing into and through the outlet conduit.

The pump will then continually operate at near its rated capacity for a given horsepower input resulting in a more efficient pumping operation.

Although but three embodiments have been illustrated and described, it will be apparent to those skilled in the art that various changes and modifications may be made therein without departing from the spirit of the invention or from the scope of the appended claims.

What is claimed is:

1. In a partially filled liquid containing tank defining an outlet, a baffle structure, said structure comprising a plurality of spaced apart elbow vanes extending transversely across said tank adjacent said outlet, said vanes being arranged to form an inverted troughlike structure positioned over said outlet with the ridge of the structure being removed from said outlet whereby liquid converging on said outlet will be deflected by said vanes into said outlet.

2. A liquid containing unit comprising a tank defining an outlet, said liquid having a surface spaced from an adjacent tank wall an outlet conduit extending from the said outlet, a baffle structure, said structure comprising a plurality of spaced apart elbow vanes, said vanes being mounted on supports and arranged to form an inverted troughlike structure positioned over said outlet with the ridge of said structure being removed from said outlet, the inner portion of said vanes extending in a direction substantially parallel to the longitudinal axis of said conduit, the outer portion of said vanes extending outwardly into said tank for receiving liquid converging on said outlet whereby liquid converging on said outlet will be deflected by said vanes into said outlet in a path substantially parallel to the longitudinal axis of said outlet conduit.

3. A liquid containing unit comprising a partially filled liquid containing tank having a wall portion defining an outlet, an outlet conduit extending from said outlet, and a baffle structure positioned within said unit between said wall portion and a point over said outlet, said baffle comprising a plurality of spaced apart elbow vanes positioned in gradual inclines extending from said wall portion and converging toward said point; the outer portion of said vanes extending outwardly into said tank for receiving liquid converging on said outlet, the inner portion of said vanes extending in a direction substantially parallel to the longitudinal axis of said conduit, whereby liquid converging on said outlet is deflected by said vanes into said outlet in paths substantially parallel to the longitudinal axis of said outlet conduit.

4. A liquid containing unit comprising a partially filled liquid containing tank having a wall portion defining an outlet, an outlet conduit extending from said outlet, a baffle structure positioned within said unit between said wall portion and a point over said outlet, said structure comprising a plurality of spaced apart elbow vanes positioned in gradual inclines extending from said wall portion and converging toward said point to form a pyramid having its apex at said point, the inner portion of said vanes extending in a direction substantially parallel to the longitudinal axis of said conduit, the outer portion of said vanes extending outwardly into said tank for receiving liquid converging on said outlet whereby liquid converging on said outlet will be deflected by said vanes into said outlet in a path substantially parallel to the longitudinal axis of said outlet conduit.

5. A liquid containing unit comprising a partially filled liquid containing tank having a wall portion defining an outlet, an outlet conduit extending from said outlet, a baffle structure positioned within said unit between said wall portion and a point over said outlet, said structure comprising a plurality of spaced apart elbow vanes positioned in gradual inclines extending from said wall portion and converging toward said point to form a cone having its apex at said point, the inner portion of said vanes extending in a direction substantially parallel to the longitudinal axis of said conduit, the outer portion of said vanes extending outwardly into said tank for receiving liquid converging on said outlet whereby liquid converging on said outlet will be deflected by said vanes into said outlet in a path substantially parallel to the longitudinal axis of said outlet conduit.

References Cited in the file of this patent

UNITED STATES PATENTS

| Number | Name | Date |
|---|---|---|
| 109,452 | Reed | Nov. 22, 1870 |
| 1,049,407 | Scheaermann | Jan. 7, 1913 |
| 1,642,479 | Barthel | Sept. 13, 1927 |
| 1,827,727 | Blizard | Oct. 20, 1931 |
| 2,541,251 | Honerkamp | Feb. 13, 1951 |
| 2,611,685 | Yoder | Sept. 23, 1952 |
| 2,632,466 | Ayers | Mar. 24, 1953 |
| 2,667,185 | Beavers | Jan. 26, 1954 |
| 2,684,690 | Lee | July 27, 1954 |
| 2,732,071 | Crow | Jan. 24, 1956 |
| 2,735,352 | Demuth | Feb. 21, 1956 |
| 2,750,865 | Tutt | June 19, 1956 |
| 2,768,814 | Frey | Oct. 30, 1956 |
| 2,772,624 | Carnes | Dec. 4, 1956 |